(12) United States Patent
Nishikawa et al.

(10) Patent No.: US 8,077,264 B2
(45) Date of Patent: Dec. 13, 2011

(54) TOUCH INPUT FUNCTION-EQUIPPED PROTECTION PANEL FOR ELECTRONIC DEVICE DISPLAY WINDOW

(75) Inventors: Kazuhiro Nishikawa, Kyoto (JP); Yoshihiro Kai, Kyoto (JP); Kazuto Nakamura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 464 days.

(21) Appl. No.: 12/446,834

(22) PCT Filed: Nov. 1, 2007

(86) PCT No.: PCT/JP2007/071335
§ 371 (c)(1),
(2), (4) Date: Apr. 23, 2009

(87) PCT Pub. No.: WO2008/053967
PCT Pub. Date: May 8, 2008

(65) Prior Publication Data
US 2010/0090978 A1    Apr. 15, 2010

(30) Foreign Application Priority Data

Nov. 2, 2006   (JP) ................................. 2006-298737

(51) Int. Cl.
*G02F 1/1335* (2006.01)
(52) U.S. Cl. .............................................. 349/12
(58) Field of Classification Search .................. None
See application file for complete search history.

(56) References Cited

U.S. PATENT DOCUMENTS

| 7,920,225 | B2 * | 4/2011 | Nishikawa et al. ............. 349/60 |
| 2007/0181456 | A1 | 8/2007 | Kusuda et al. | |
| 2008/0106522 | A1 | 5/2008 | Nishikawa et al. | |
| 2010/0225866 | A1 * | 9/2010 | Sakamaki et al. ............. 349/139 |

FOREIGN PATENT DOCUMENTS

| JP | 9-50731 | 2/1997 |
| WO | 2005/064451 | 7/2005 |
| WO | 2006/077784 | 7/2006 |

OTHER PUBLICATIONS

Supplementary European Search Report dated Oct. 28, 2009 in counterpart European Patent Application No. 07831069.
International Search Report mailed Feb. 5, 2008 for International Application No. PCT/JP2007/071335.

* cited by examiner

*Primary Examiner* — Sung Pak
(74) *Attorney, Agent, or Firm* — Wenderoth, Lind & Ponack, L.L.P.

(57) ABSTRACT

A touch input function-equipped protection panel for an electronic device display window which can suppress deterioration of electric properties and appearance quality in a lead wire connection part, includes a touch panel having a flexible upper electrode plate and an inflexible lower electrode plate arranged face-to-face at a prescribed gap in a manner that the electrode surfaces are directed to inside and being formed by sticking the outer circumferential parts of the respective electrode plates with an insulating adhesive layer interposed therebetween; a decorative film having a transparent window part and stuck to the surface of the upper electrode plate; and a pin-equipped lead wire for extracting an electric signal from an electrode terminal of the electrode plate through respective metal pins inserted into a plurality of through holes formed on the lower electrode plate, wherein an elastomeric binder-containing conductive adhesive layer is formed on the electrode terminal of at least one of the upper electrode plate and the lower electrode plate as an underlayer of a conductive adhesive to be injected into the respective through holes.

11 Claims, 4 Drawing Sheets

[Fig. 1]
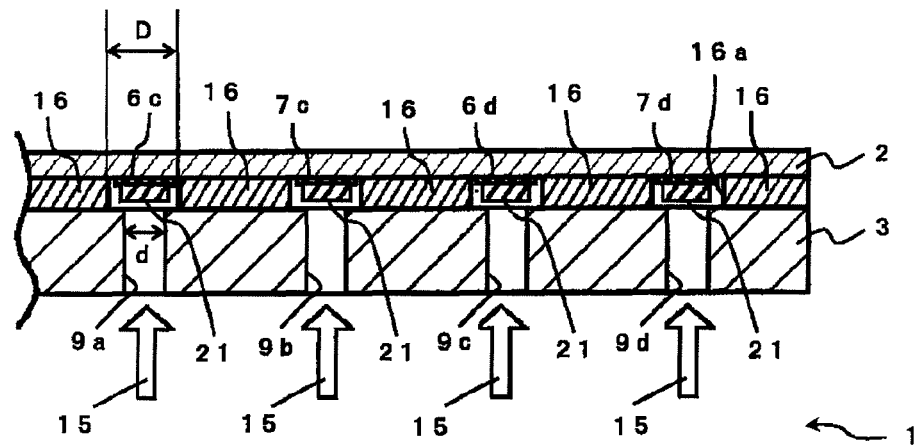
[Fig. 2]
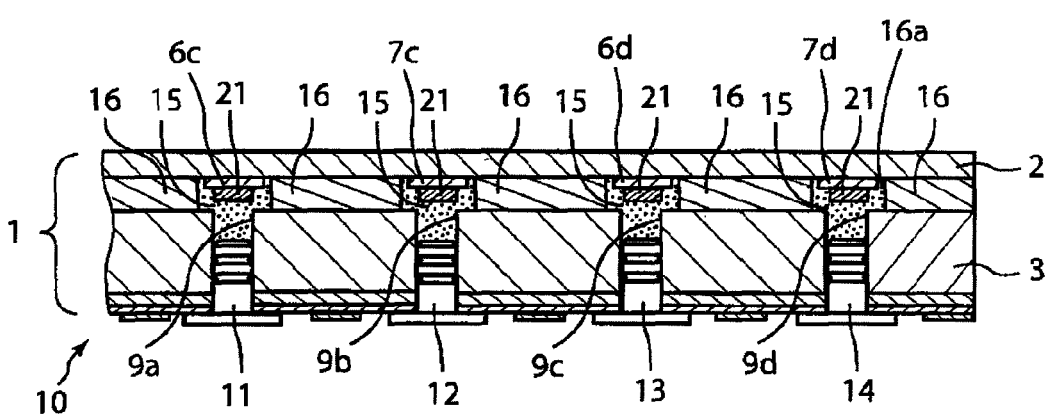

[Fig. 3]
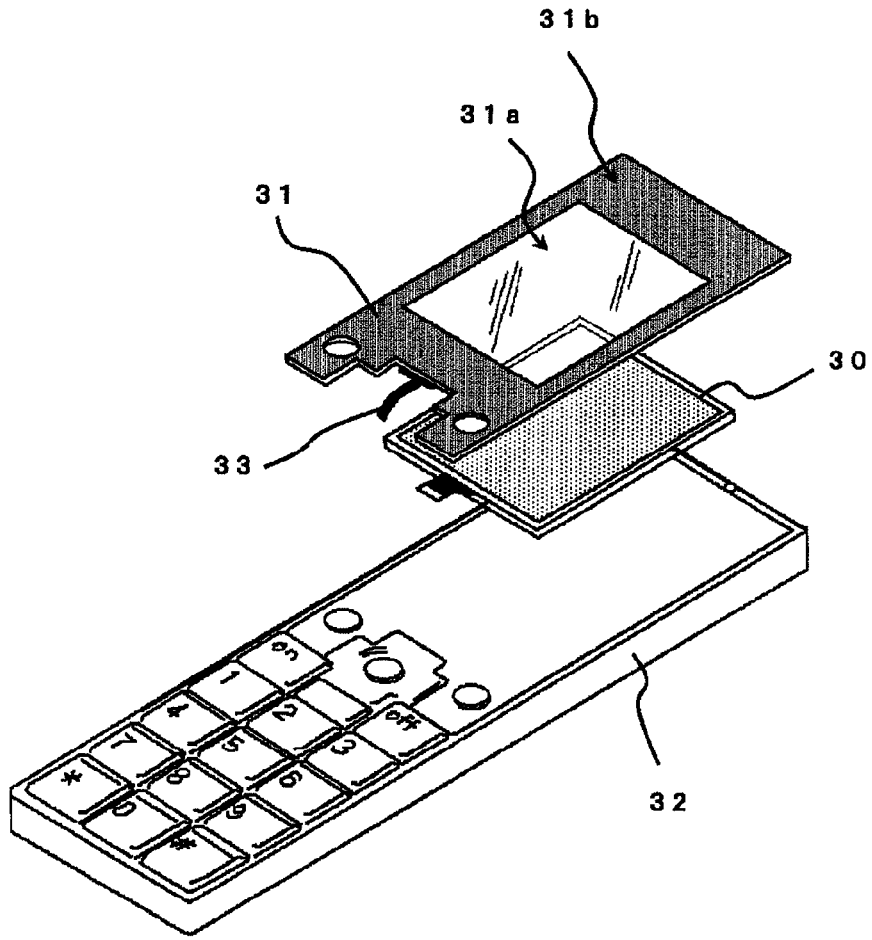
[Fig. 4]
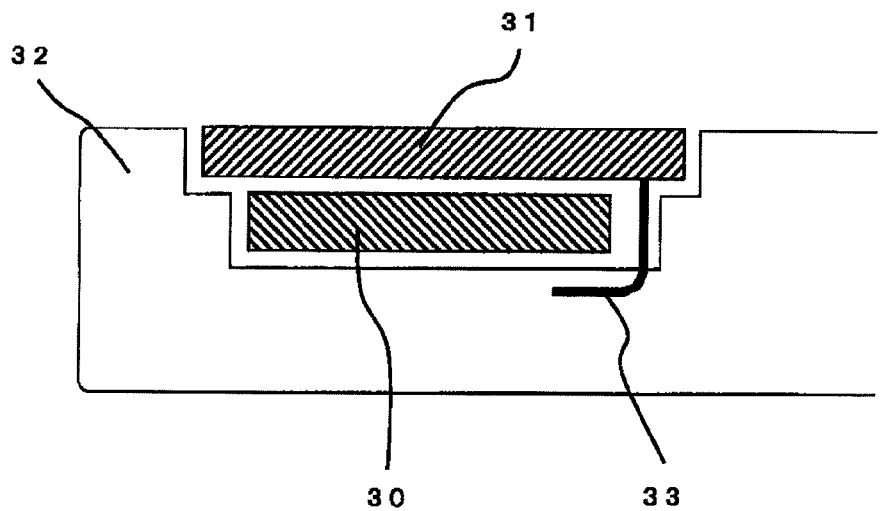

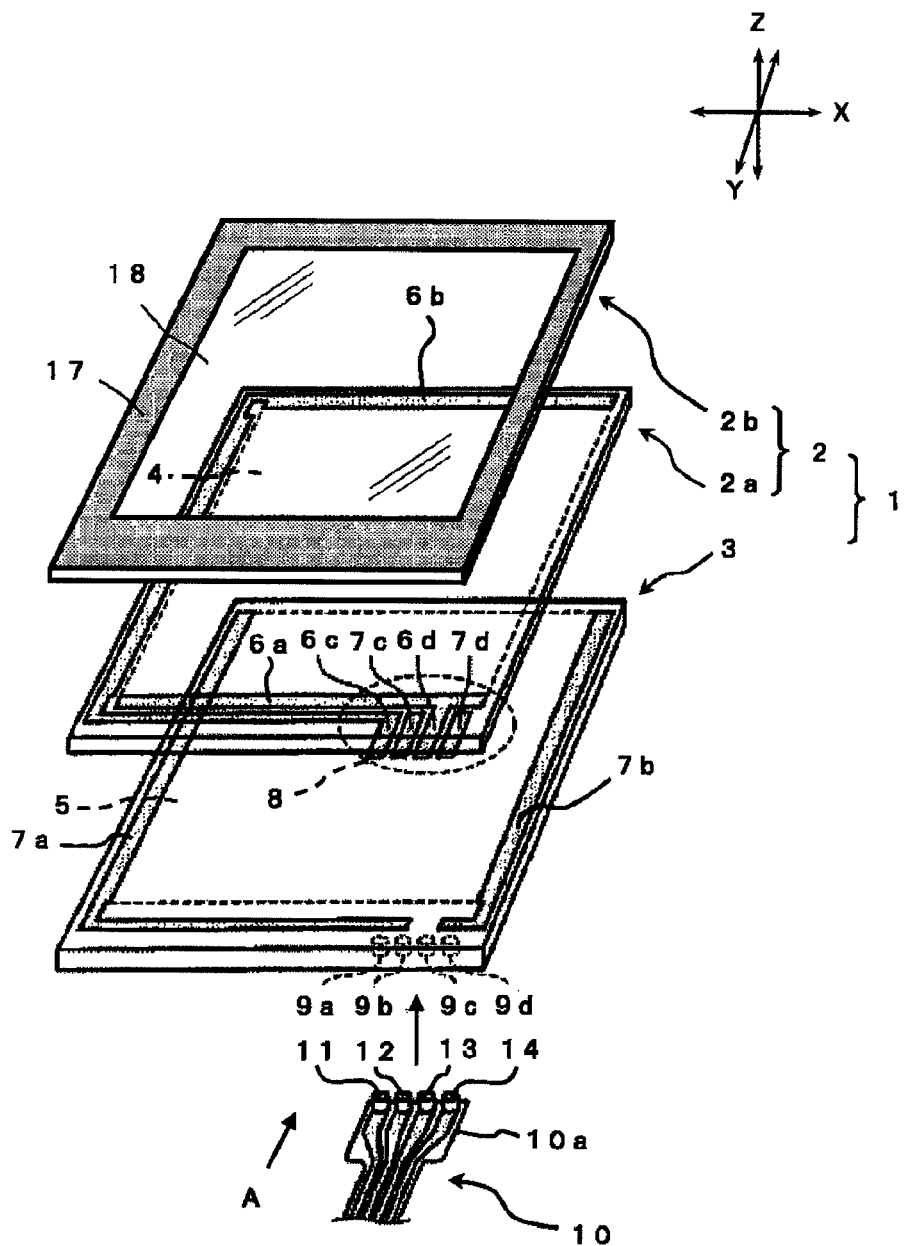
[Fig. 5]

[Fig. 6]
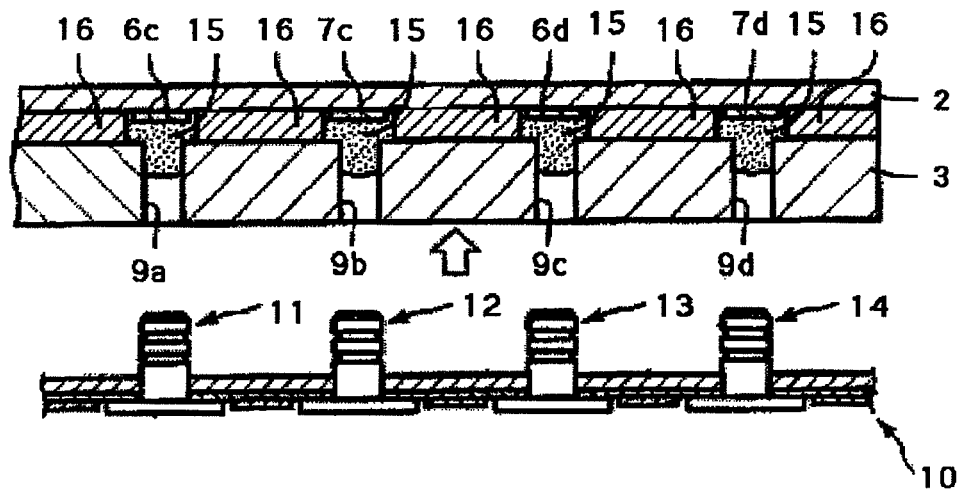
[Fig. 7]
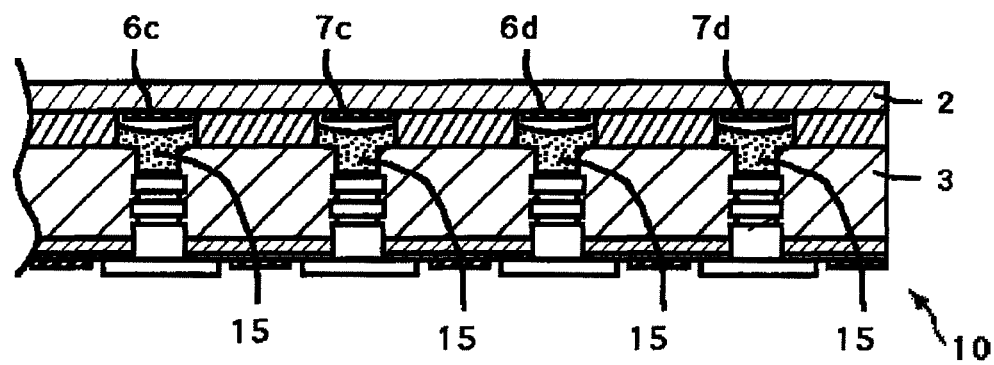
[Fig. 8]
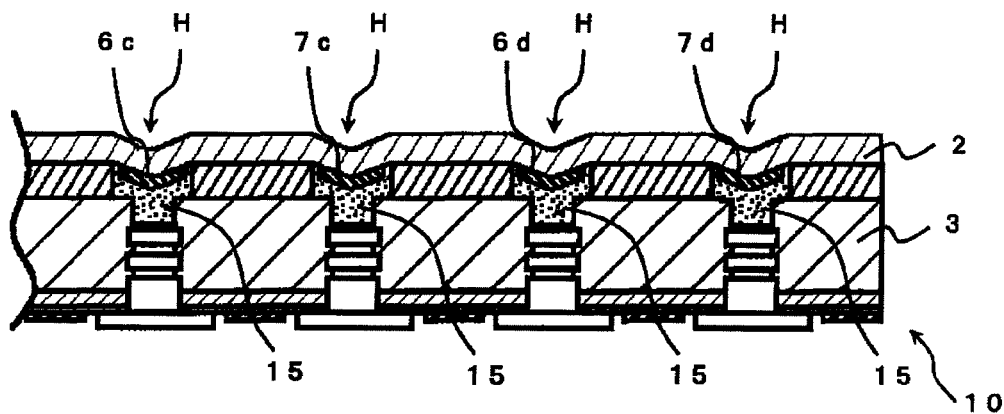

TOUCH INPUT FUNCTION-EQUIPPED PROTECTION PANEL FOR ELECTRONIC DEVICE DISPLAY WINDOW

TECHNICAL FIELD

The present invention relates to a touch input function-equipped protection panel for an electronic device display window capable of suppressing deterioration of electric properties and external appearance quality in a lead wire connection part.

BACKGROUND ART

A touch panel is mounted on a display part of mobile electronic terminals such as PDA and handy terminals, OA appliances such as copying machines and facsimiles, smart phones, mobile phones, portable game devices, electric dictionaries, car navigation systems, compact type PC, various kinds of domestic electric articles, and other appliances.

A method for mounting the above touch panel generally involves fitting a display of a LCD or the like in a lower side casing between an upper side casing and the lower side casing to be combined, sticking a touch panel on the display, and thereafter putting the upper side casing having an aperture part corresponding to the display area of the touch panel on the touch panel while pressing the outer circumferential rim part of the touch panel surface, and joining the upper side casing and the lower side casing to mount the touch panel.

However, because of the structure of covering the outer circumferential rim part of the touch panel by putting the upper side casing thereon (bezel structure), a step corresponding to the thickness of the upper side casing is inevitably formed on the surface of the touch panel and thus there has been a defect that the display part cannot be made to have a flat structure with an excellent design.

Further, in a case the upper side casing is erroneously pushed at the time of input operation, or a portion of the circumference of the touch panel is pushed through the upper side casing, erroneous input may be caused.

Further, the touch panel in the part along the rim of the aperture part of the upper side casing tends to be abraded repeatedly by unintentionally slipping along the step of the upper side casing and the touch input function tends to be deteriorated and furthermore, in a case of wiping out sebum or the like adhering to the touch panel operation surface, since there is a step between the touch panel and the above aperture part of the upper side casing, there has been a problem that the stains adhering to the operation surface near the step are difficult to be completely wiped out.

Therefore, in order to solve these problems, it is known that a technique of mounting a touch input function-equipped protection panel in a product 32 in a state that a cover film 31 on which a patterned layer 31b is formed in the circumference of a transparent window part 31a is arranged on the front surface of a touch panel to be laminated on a display 30, while making the inner configuration such as a circuit or the like invisible from the outside (see FIG. 3). In the drawing, 33 denotes FPC (flexible printed circuit).

This kind of touch input function-equipped protection panel for an electronic device display window (hereinafter, referred to as a touch input function-equipped protection panel by abbreviation) is disclosed in Patent Document 1: International Publication WO2005/064451.

Since a bezel structure which is characteristic for conventional touch panel-equipped products is not necessary by the touch input function-equipped protection panel having the above configuration, not only display parts of products can be designed to be flat without a step but also the products can be made thin (see FIG. 4).

The configuration of the above touch input function-equipped protection panel 1 will be described in more detail with reference to the exploded view of FIG. 5.

In this drawing, the touch input function-equipped protection panel 1 including (a) an upper electrode plate 2a made of a flexible transparent insulating film such as a polyethylene terephthalate film, (b) a lower electrode plate 3 made of an inflexible glass plate; an engineering plastic such as a polycarbonate, polyamide, and polyether ketone; an inflexible plastic plate of such as acrylic, polyethylene terephthalate, and polybutylene terephthalate; or a laminated plate thereof, and (c) a decorative film 2b having a decoration layer 17 formed in the circumference of a transparent window part 18 formed on the front surface of the above upper electrode plate 2a and both electrode plates 2a and 3 are stuck to each other in the outer circumferential part with an insulating adhesive layer, which is not illustrated, interposed therebetween in a state that the plates are set face to face at a prescribed gap.

The decorative film 2b is generally made of a flexible transparent insulating film other than that of the above upper electrode plate 2a, for example, a polyethylene terephthalate film of which a decoration layer is previously formed on one surface and it is stuck to the entire front surface of the upper electrode plate 2a (hereinafter, a laminate of the upper electrode plate 2a and the decoration film 2b is referred to as a movable film 2).

ITO (indium tin oxide) or the like as resistance films 4 and 5 is formed on opposed surfaces of the respective electrode plates 2a and 3 by sputtering or vacuum deposition.

Further, strip-like electrodes 6a and 6b to be connected with the resistance film 4 and made of a silver paste are formed in parallel on the upper electrode plate 2a and strip-like electrodes 7a and 7b to be connected with the resistance film 5 are formed on the lower electrode plate 3 in a direction perpendicular to the electrodes 6a and 6b.

The respective electrodes 6a, 6b, 7a, and 7b are extended to a connection part 8 formed in a rim part of the upper electrode plate 2a and arranged collectively in one place.

Additionally, in FIG. 5, different from the configuration described in Patent Document 1, through holes 9a to 9d are formed in parallel to the Z direction corresponding to respective electrode terminals 6c, 7c, 6d, and 7d in the connection part 8.

Corresponding to these through holes 9a to 9d, four metal pins 11 to 14 are uprightly installed in the connection side end part of a FPC (flexible printed circuit) 10 as a lead wire.

These metal pins 11 to 14 are connected to the electrode terminals 6c, 7c, 6d, and 7d by using a conductive adhesive, which is not illustrated, to make electric continuity.

A method for connecting lead wires from the rear surface of the lower electrode plate 3 is disclosed in Patent Document 2: International Publication WO2006/077784.

However, a method of extracting signals by inserting the metal pins 11 to 14 projected from the lead wire 10 into through holes 9a to 9d of the lower electrode plate 3 as shown in FIG. 5 has the following problems.

A method of fixing the metal pins 11 to 14 to the lower electrode plate 3 will be described as follows, with reference to FIG. 6 and FIG. 7 showing partially magnified cross-sectional views observed from the direction shown with the arrow A of FIG. 5.

At first, in FIG. 6, the respective hole diameters of the though holes 9a to 9d formed on the lower electrode plate 3 are set to be in a range of a diameter equal to or about 30% smaller than the outer diameter of the metal pins 11 to 14 and a conductive adhesive 15 is injected into the respective through holes 9a to 9d for obtaining electric connection to the respective electrode terminals 6c, 7c, 6d, and 7d.

Next, when the axial parts of the metal pins 11 to 14 are inserted by pressure into the through holes 9a to 9d while ultrasonic vibration and pressure are applied to the head parts of the metal pins 11 to 14 via an ultrasonic insertion apparatus which is not illustrated, friction heat is generated locally in the boundary surfaces of the respective axial parts of the metal pins 11 to 14 and the through holes 9a to 9d and the metal pins 11 to 14 are inserted while melting the resin of the wall surfaces of the through holes 9a to 9d.

Thereafter, when the resin of the wall surfaces of the through holes is re-solidified by moving out the ultrasonic insertion apparatus, the metal pins 11 to 14 are firmly fixed to the lower electrode plate 3.

However, there is a possibilities that the lead wire connection part formed in such a manner may possibly cause peeling between the electrode terminals and the conductive adhesive (see FIG. 7) or between the conductive adhesive and metal pins by shrinkage at the time of heat drying or normal temperature curing since the conductive adhesive 15 is cured by heat drying or normal temperature curing (wet curing, anaerobic curing, or two-part reaction curing).

Further, when the respective electrode terminals are all together pulled at the time of shrinkage of the conductive adhesive 15, as shown in FIG. 8, a plurality of circular dent parts H are formed on the surface of the movable film 2 and thus the appearance quality is deteriorated.

DISCLOSURE OF THE INVENTION

In view of the above conventional technical problems, the present invention provides a touch input function-equipped protection panel for an electronic device display window capable of preventing deterioration of the electric properties and appearance quality in a lead wire connection part.

The present invention relates to a touch input function-equipped protection panel for an electronic device display window, comprising a touch panel having a flexible upper electrode plate and an inflexible lower electrode plate arranged face-to-face at a prescribed gap in a manner that the electrode surfaces are directed to inside and being formed by sticking the outer circumferential parts of the respective electrode plates with an insulating adhesive layer interposed therebetween; a decorative film having a transparent window part and stuck to the surface of the upper electrode plate, and a pin-equipped lead wire for extracting an electric signal from an electrode terminal of the electrode plate through respective metal pins inserted into a plurality of through holes formed on the lower electrode plate, wherein an elastomeric binder-containing conductive adhesive layer is formed on the electrode terminal of at least one of the upper electrode plate and the lower electrode plate as an underlayer of a conductive adhesive to be injected into the respective through holes.

In the present invention, with the configuration that the electrode terminals of the above upper electrode plate and lower electrode plate are arranged collectively in the upper electrode plate side, the conductive adhesive layer containing the elastomeric binder is formed in all of the electrode terminals.

In the present invention, the binder of the conductive adhesive to be inserted into the through holes can be obtained by adding a conductive filler to an adhesive containing one of silicon, epoxy, acrylic, and urethane resins as a binder.

In the present invention, the elastomeric binder can be constituted with a natural rubber or synthetic rubber such as styrene-butadiene rubber, acrylonitrile-butadiene rubber, ethylene-propylene rubber, chloroprene rubber, isoprene rubber, butyl rubber, butadiene rubber, chlorosulfonated polyethylene and styrene thermoplastic elastomer.

In the present invention, it is preferred that the elastomeric binder is constituted particularly by chloroprene rubber.

In the present invention, it is preferred that the elastomeric binder is constituted by a blend of chloroprene rubber and a phenol resin.

In the present invention, it is preferred that a content of the conductive filler contained as a conductive material in the elastomeric binder is 0.5 to 90 parts by weight based on 100 parts by weight of the elastomeric binder.

It is also preferred that a surface area of the elastomeric binder-containing conductive adhesive layer is 10 to 100% to a surface area of the electrode terminal of the upper electrode plate.

It is preferred that a thickness of the elastomeric binder-containing conductive adhesive layer is 10 to 90% of a particle diameter of the conductive filler contained as the conductive material.

According to the present invention, since the conductive adhesive layer containing the elastomeric binder is previously formed in the above upper electrode plate as an underlayer of the conductive adhesive to be injected into the through holes at the time of installation of the pin-equipped lead wires for the upper electrode plate, the conductive adhesive layer containing the elastomeric binder absorbs the shrinkage of the conductive adhesive to be injected into the through holes at the time of heat drying or normal temperature curing.

Accordingly, peeling between the electrode terminals and the conductive adhesive or between the conductive adhesive and the metal pins can be prevented and connection reliability can be improved. Further, owing to the absorption of the shrinkage at the time of heat drying or normal temperature curing, a strain (e.g., a circular dent) to be caused on the touch input function-equipped protection panel surface can be prevented and the appearance quality can be improved.

BRIEF DESCRIPTION OF THE DRAWINGS

FIG. 1: A vertical cross-sectional view showing a method for connecting lead wires of a touch input function-equipped protection panel for an electronic device display window according to the present invention.

FIG. 2: A vertical cross-sectional view showing the configuration of the touch input function-equipped protection panel of the present invention.

FIG. 3: An exploded perspective view showing an installation example of the touch input function-equipped protection panel of the present invention.

FIG. 4: A vertical cross-sectional view showing the installed touch input function-equipped protection panel of the present invention.

FIG. 5: An exploded perspective view showing the configuration of the touch input function-equipped protection panel of the present invention.

FIG. 6: A vertical cross-sectional view showing a method for connecting lead wires of a conventional touch input function-equipped protection panel for an electronic device display window.

FIG. 7: A vertical cross-sectional view showing the lead wire connection configuration of a conventional touch input function-equipped protection panel.

FIG. 8: A vertical cross-sectional view describing a dent formed in the conventional touch input function-equipped protection panel.

BEST MODE FOR CARRYING OUT THE INVENTION

Hereinafter, the present invention will be described in detail in accordance with embodiments shown in drawings.

A basic configuration of a touch input function-equipped protection panel for an electronic device display window according to the present invention is the same as that of the touch input function-equipped protection panel shown in FIG. 5 and therefore, it is described with reference to FIG. 5.

In this drawing, the touch input function-equipped protection panel 1 includes (a) an upper electrode plate 2a having a flexible transparent insulating film of engineering plastic such as a polycarbonate, polyamide, or polyether ketone, or a film of an acrylic, polyethylene terephthalate, or polybutylene terephthalate and (b) a lower electrode plate 3 made of an inflexible engineering plastic such as a polycarbonate, polyamide, or polyether ketone; a plastic plate of an acrylic, polyethylene terephthalate, or polybutylene terephthalate; or a laminated plate thereof.

Both electrode plates 2a and 3 are stuck to each other in the outer circumferential part with an insulating adhesive layer, which is not illustrated, interposed therebetween in a state that the electrodes plates are set face-to-face at a prescribed gap.

As resistance films 4 and 5, a metal oxide film of such as tin oxide, indium oxide, antimony oxide, zinc oxide, cadmium oxide, or ITO, or a composite film containing mainly these metal oxides, a metal film of such as gold, silver, copper, tin, nickel, aluminum, or palladium, or the like is formed by the vacuum deposition method, sputtering, ion plating, or the CVD method in the inner surfaces of the respective electrode plates 2a and 3.

Strip-like electrodes 6a and 6b to be connected with the resistance film 4 and made of paste having conductivity of a metal such as gold, silver, copper or nickel or carbon are formed in parallel on the upper electrode plate 2a and strip-like electrodes 7a and 7b to be connected with the resistance film 5 are formed on the lower electrode plate 3 in a direction perpendicular to the electrodes 6a and 6b.

These strip-like electrodes 7a and 7b may be formed by a printing method such as screen printing, offset printing, gravure printing, or flexo printing; a photoresist method; a brush coating method; or the like.

The respective electrodes 6a, 6b, 7a, and 7b are extended to a connection part 8 formed in a rim part of the upper electrode plate 2a and arranged collectively in one place.

Through holes 9a to 9d are formed on the lower electrode plate 3 corresponding to respective electrode terminals 6c, 7c, 6d, and 7d in the connection part 8.

Corresponding to these through holes 9a to 9d, four metal pins 11 to 14 are uprightly installed in the connection side end part of a FPC 10 as lead wires and these metal pins 11 to 14 are connected to the electrode terminals 6c, 7c, 6d, and 7d using a conductive adhesive, which is not illustrated, to make electric continuity.

Further, a decorative film 2b having a transparent window part 18 is stuck to the surface of the upper electrode plate 2a. In the decorative film 2b, of the circumference of one surface of a flexible transparent insulating film such as an engineering plastic of, for example, a polycarbonate, polyamide, or polyether ketone engineering plastic; or a film of an acrylic, polyethylene terephthalate, or polybutylene terephthalate film is colored in a window frame shape to form the transparent window part 18 and the opaque colored part forms a decorative layer 17 for sealing the inside of the decorative film 2b.

The above decorative layer 17 may be formed using a coloring ink containing a resin such as a polyvinyl resin, a polyamide resin, a polyester resin, a polyacrylic resin, a polyurethane resin, a polyvinyl acetal resin, a polyester urethane resin, or an alkyd resin as a binder, and a pigment or dye with proper color as a coloring agent.

As a formation method of the decorative layer 17, a common printing method such as screen printing, offset printing, gravure printing, or flexo printing may be used. Particularly, in order to carry out multicolor printing or gradation expression, the offset printing method and the gravure printing method are suitable.

Further, the decorative layer 17 may be composed of only a metal thin film layer or a combination of a printed decorative layer and the above metal thin film layer.

The above metal thin film layer expresses metallic luster and may be formed by the vacuum deposition method, the sputtering method, the ion plating method, the plating method or the like. In this case, in accordance with the metallic luster color to be expressed, a metal such as aluminum, nickel, gold, platinum, chromium-iron, copper, tin, indium, silver, titanium, lead or zinc or an alloy or a compound thereof may be used. The thickness of the metal thin film layer is generally about 0.05 μm.

The decorative film 2b is stuck to the entire front surface of the upper electrode plate 2a and constitutes a portion of a movable film 2.

As an adhesive layer to be used for the sticking, for example, a polyacrylic resin, a polystyrene resin, or a polyamide resin; or a vinyl chloride, vinyl acetate, or an acrylic copolymer may be used. As a formation method of the adhesive layer 5d, a conventional printing method such as screen printing, offset printing, gravure printing, or flexo printing may be used.

Next, the lead wire connection structure, which is a characteristic of the present invention, will be described with reference to FIG. 1. The same symbols are assigned to the constituent elements which are the same as those in FIG. 5 and the description is not given here.

In FIG. 1, the numeral reference 16 shows an adhesive layer for sticking the upper electrode plate 2a of the movable film 2 and the lower electrode plate 3 in their outer circumferential parts.

In this adhesive layer 16, respective connection holes 16a for injecting of a conductive adhesive (shown with the arrow 15) have to be formed corresponding to the respective electrode terminals 6c, 7c, 6d, and 7d. That is, the through holes 9a to 9d formed on the lower electrode plate 3 are communicated with the respective connection holes 16a and the conductive adhesive 15 is to be injected into the respective connection holes 16a through the through holes 9a to 9d.

In addition, the size D of the connection holes 16a is made to be larger than the diameter d of the through hole 9a.

Further, as the adhesive layer 16, a frame-like double-faced tape where at least a part for inputting while seeing through an LCD screen or the like (transparent window part 18 in FIG. 5) and the respective connection holes 16a, 16a, 16a, and 16a are formed by punching may be used. Furthermore, in place of the double-faced tape, an insulating adhesive, for example, water-based or acrylic printing glue may be used.

The above conductive adhesive 15 is obtained by adding a conductive filler to an adhesive containing any of a silicon, epoxy, acrylic or urethane resin as a binder.

Examples of the conductive filler include conductive metal powders of such as silver, gold, copper, nickel, platinum, and palladium and also those obtained by using inorganic insulators such as alumina and glass or organic polymers such as polyethylene, polystyrene, and divinylbenzene as a core material and covering the core material surface with a conductive layer of such as gold and nickel, and carbon and graphite.

The above conductive filler to be used may also have a flake like, spherical or short fibrous shape. An application method for the conductive adhesive may be a dispenser method, or the like.

The respective metal pins 11 to 14 are inserted into the through holes 9a to 9d into which the conductive adhesive 15 is injected and the inserted metal pins 11 to 14 are fixed to the lower electrode plate 3.

A means for inserting the metal pins 11 to 14 to be used may be, for example, a method of setting the respective hole diameter of the through holes 9a to 9d to be equal to or about 30% smaller than the outer diameter of the metal pins 11 to 14 and inserting the axial parts of the metal pins 11 to 14 into the through holes 9a to 9d while applying ultrasonic vibration and pressure to the head parts of the metal pins 11 to 14 by an ultrasonic insertion apparatus.

It is because in the fixation method using the ultrasonic insertion apparatus, local friction heat is generated in the boundary surfaces of the respective axial parts of the metal pins 11 to 14 and the through holes 9a to 9d and the metal pins 11 to 14 are inserted while the resin of the wall surfaces of the through holes 9a to 9d is melted and the metal pins 11 to 14 are firmly fixed by re-solidifying of the wall surfaces.

FIG. 2 shows a state that fixation of the metal pins 11 to 14 to the lower electrode plate 3 is completed.

In this drawing, the connection holes 16a and the though holes 9a to 9d are filled with the conductive adhesive 15 and for description with reference to the electrode terminal 6c, the electrode terminal 6c is connected with the metal pin 11 through a rubber conductive adhesive layer (elastomeric binder-containing conductive adhesive layer) 21 and the conductive adhesive 15 (described later) interposed therebetween.

Further, since a portion of the conductive adhesive 15 filled in the connection hole 16a is in direct contact with the electrode terminal 6c, it is effective to increase the electrical conductivity. In addition, the thermal shrinkage of the conductive adhesive 15 to be caused in the connection hole 16a is less than that caused in the through hole 9a and thus there is no possibility of peeling from the electrode terminal 6c.

The characteristic of the present invention is that the rubber binder-containing conductive adhesive layer (hereinafter, referred to as a rubber conductive adhesive layer by abbreviation) 21 is formed on the upper electrode plate 2a as an underlayer for the conductive adhesive layer 15 to be injected into the through holes 9a to 9d, more particularly, the rubber conductive adhesive layer 21 is formed on the surfaces of the respective electrode terminals 6c, 7c, 6d, and 7d in the metal pin connection side in the connection part 8 as an underlayer.

Formation of the rubber conductive adhesive layer 21 as an underlayer as described above makes it possible to absorb the shrinkage by the rubber conductive adhesive layer 21 even if the conductive adhesive 15 to be injected into the through holes 9a to 9d is shrunk at the time of heat drying or normal temperature curing.

Accordingly, peeling between the electrode terminal and the conductive adhesive or between the conductive adhesive and the metal pin can be prevented and as a result, connection reliability can be improved.

Further, owing to the absorption of the shrinkage at the time of heat drying or normal temperature curing, deformation of the movable film 2, a laminate body of the upper electrode plate 2a and the decorative film 2b, can be prevented and as a result, the external appearance quality of the touch input function-equipped protection panel 1 can be improved.

The rubber conductive adhesive layer 21 is formed by adding a conductive filler to an adhesive including a rubber binder of any of a natural rubber (NR) or synthetic rubber such as styrene-butadiene rubber (SBR), acrylonitrile-butadiene rubber (NBR), ethylene-propylene rubber (EPDM), chloroprene rubber (CR), isoprene rubber, butyl rubber (IIR), butadiene rubber (BR), chlorosulfonated polyethylene and styrene thermoplastic elastomer (SBC), a solvent, and the like.

Further, examples of the conductive filler include conductive metal powders of such as silver, gold, copper, nickel, platinum, and palladium and also those obtained by using inorganic insulators such as alumina or glass and organic polymers such as polyethylene, polystyrene, and divinylbenzene as a core material and covering the core material surface with a conductive layer of such as gold and nickel, and also carbon, graphite and the like.

The content of the conductive filler is preferably 0.5 to 90 parts by weight based on 100 parts by weight of the rubber binder. If the content is lower than 0.5 parts by weight, electric continuity becomes inferior and on the other hand, if it exceeds 90 parts by weight, the adhesive force and the stress absorption capability at the time of curing are decreased and in addition, the cost becomes high.

The rubber conductive adhesive layer 21 is preferable to be formed in 10 to 100% of the surface area of the electrode terminal of the upper electrode plate 2a. If the surface area ratio is below 10%, the adhesive force and the stress absorption capability are decreased and on the other hand, if it exceeds 100%, the layer overlaps the above adhesive layer 16 and bulges may be generated on the surface of the decorative film 2b corresponding to the overlapping part in some cases when the size of the respective connection holes 16a to 16d of the adhesive layer 16 is small. Therefore, the external appearance quality of the touch input function-equipped protection panel 1 is deteriorated.

Further, the thickness of the rubber conductive adhesive layer 21 is preferable to be 10 to 90% of the particle diameter of the conductive filler. If the thickness is below 10%, the adhesive force and the stress absorption capability are decreased and on the other hand, if it exceeds 90%, the electric continuity becomes inferior and the cost becomes high.

For the description of the thickness of the rubber conductive adhesive layer 21, it is assumed that the conductive filler is particles; however the filler is not limited to that, and as described above, the filler to be used may be those having a flake, spherical, or short fibrous shape.

Further, because being excellent in heat resistance, ozone resistance, weather resistance, oil resistance, and flame resistance and also excellent in processability, mechanical strength, rubber elasticity, and adhesiveness as compared with other rubbers among the above exemplified natural rubbers and synthetic rubbers, chloroprene rubber is more preferable to be used as a rubber binder. Furthermore, if phenol resin is blended with the chloroprene rubber (CR), the cohesion force of the adhesive is increased and the heat resistance becomes more excellent.

Further, examples of a formation method of the above rubber conductive adhesive layer 21 include screen printing, dispenser coating and the like. After the formation of the adhesive layer, the solvent in the rubber adhesive is removed by heating treatment and dried/solidified.

Among the above various embodiments, arbitrary embodiments may be combined properly to exert the respective effects of the embodiments.

Though the present invention has been described sufficiently with relating to the preferred embodiment while referring to the appended drawings, it is possible for those skilled in the art to carry out the present invention with various modifications and alterations. It should be understood that such modifications are included in the present invention as long as they are within the technical scope of the present invention.

INDUSTRIAL APPLICABILITY

The present invention can be applied for a display part of mobile electronic terminals such as PDA and handy terminals, OA appliances such as copying machines and facsimiles, smart phones, mobile phones, portable game devices, electronic dictionaries, car navigation systems, compact PC, various kinds of home appliances, and other appliances.

The invention claimed is:

1. A touch input function-equipped protection panel for an electronic device display window, comprising a touch panel having a flexible upper electrode plate and an inflexible lower electrode plate arranged face-to-face at a prescribed gap in a manner that the electrode surfaces are directed to inside and being formed by sticking the outer circumferential parts of the respective electrode plates with an insulating adhesive layer interposed therebetween; a decorative film having a transparent window part and stuck to the surface of said upper electrode plate, and a pin-equipped lead wire for extracting an electric signal from an electrode terminal of said electrode plate through respective metal pins inserted into a plurality of through holes formed on said lower electrode plate, wherein
an elastomeric binder-containing conductive adhesive layer is formed on the electrode terminal of at least one of said upper electrode plate and said lower electrode plate as an underlayer of a conductive adhesive to be injected into the respective through holes.

2. The touch input function-equipped protection panel for an electronic device display window according to claim 1, wherein the binder of the conductive adhesive to be inserted into said through holes is obtained by adding a conductive filler to an adhesive containing one of silicon, epoxy, acrylic, and urethane resins as a binder.

3. The touch input function-equipped protection panel for an electronic device display window according to claim 1, wherein said elastomeric binder is a natural rubber or synthetic rubber such as styrene-butadiene rubber, acrylonitrile-butadiene rubber, ethylene-propylene rubber, chloroprene rubber, isoprene rubber, butyl rubber, butadiene rubber, chlorosulfonated polyethylene and styrene thermoplastic elastomer.

4. The touch input function-equipped protection panel for an electronic device display window according to claim 1, wherein said elastomeric binder is chloroprene rubber.

5. The touch input function-equipped protection panel for an electronic device display window according to claim 1, wherein said elastomeric binder is a blend of chloroprene rubber and a phenol resin.

6. The touch input function-equipped protection panel for an electronic device display window according to claim 1, wherein a content of the conductive filler contained as a conductive material in said elastomeric binder is 0.5 to 90 parts by weight based on 100 parts by weight of the elastomeric binder.

7. The touch input function-equipped protection panel for an electronic device display window according to claim 1, wherein a surface area of said elastomeric binder-containing conductive adhesive layer is 10 to 100% to a surface area of the electrode terminal of said upper electrode plate.

8. The touch input function-equipped protection panel for an electronic device display window according to claim 1, wherein a thickness of said elastomeric binder-containing conductive adhesive layer is 10 to 90% of a particle diameter of the conductive filler contained as the conductive material.

9. The touch input function-equipped protection panel for an electronic device display window according to claim 2, wherein said elastomeric binder is a natural rubber or synthetic rubber such as styrene-butadiene rubber, acrylonitrile-butadiene rubber, ethylene-propylene rubber, chloroprene rubber, isoprene rubber, butyl rubber, butadiene rubber, chlorosulfonated polyethylene and styrene thermoplastic elastomer.

10. The touch input function-equipped protection panel for an electronic device display window according to claim 2, wherein said elastomeric binder is chloroprene rubber.

11. The touch input function-equipped protection panel for an electronic device display window according to claim 2, wherein said elastomeric binder is a blend of chloroprene rubber and a phenol resin.

* * * * *